(12) United States Patent
Michaud (10) Patent No.: US 7,770,851 B2
(45) Date of Patent: Aug. 10, 2010

(54) RETAINING ELEMENT INCLUDING ENHANCED ENGAGEMENT FEATURES

(75) Inventor: Alain Michaud, Quebec (CA)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/956,398

(22) Filed: Dec. 14, 2007

(65) Prior Publication Data

US 2008/0149783 A1 Jun. 26, 2008

Related U.S. Application Data

(60) Provisional application No. 60/871,144, filed on Dec. 21, 2006.

(51) Int. Cl.
*F16L 3/22* (2006.01)
(52) U.S. Cl. .................. 248/68.1; 248/67.7; 248/65
(58) Field of Classification Search ............. 248/67.7, 248/68.1, 50, 65, 500
See application file for complete search history.

(56) References Cited

U.S. PATENT DOCUMENTS

| | | | |
|---|---|---|---|
| 1,307,240 A | 6/1919 | Christopher | |
| 1,995,370 A * | 3/1935 | Walters | ............ 248/68.1 |
| 2,061,463 A | 11/1936 | Hall | |
| 2,394,240 A | 2/1946 | Harrison | |
| 2,495,848 A | 1/1950 | Kiesel | |
| 2,560,486 A | 7/1951 | Shears | |
| 3,232,569 A * | 2/1966 | Deardorf | ............ 248/74.1 |
| 3,430,903 A | 3/1969 | Mathes | |
| 3,856,244 A | 12/1974 | Menshen | |
| 3,982,304 A | 9/1976 | Menshen | |
| 4,273,465 A | 6/1981 | Schoen | |
| 4,541,602 A | 9/1985 | Potzas | |
| 4,679,754 A * | 7/1987 | Richards | ............ 248/68.1 |
| 4,826,111 A | 5/1989 | Ismert | |
| 4,865,279 A | 9/1989 | Kosugi | |
| 5,002,243 A * | 3/1991 | Kraus et al. | ............ 248/68.1 |
| 5,031,864 A | 7/1991 | Krol | |
| 5,033,701 A | 7/1991 | Kraus | |
| 5,271,587 A | 12/1993 | Schäty et al. | |
| 5,458,303 A | 10/1995 | Ruckwardt | |
| 5,615,852 A | 4/1997 | Heidorn et al. | |

(Continued)

OTHER PUBLICATIONS

Canadian Office Action, date Aug. 3, 2009, from Canadian patent application 2,616,471 related by priority to the instant patent application.

*Primary Examiner*—J. Allen Shriver, II
*Assistant Examiner*—Bradley H Duckworth
(74) *Attorney, Agent, or Firm*—Hoffman & Baron, LLP (57) ABSTRACT

One aspect of the present invention relates to a retaining element for securing at least one elongate member to an installation surface in conjunction with a fastener. The retaining element includes a first portion and at least one second portion. The first portion secures the retaining element to the installation surface. The at least one second portion engages the elongate member. Also, the second portion defines a single continuous arch formed by a plurality of engagement surfaces disposed on a bottom side of the second portion. The engagement surfaces define a portion of the perimeter of at least two substantially overlapping shapes, such as ellipses, having different dimensions. In this way, upon installation the elongate member directly engages and is secured to both the installation surface and at least one of the engagement surfaces.

22 Claims, 6 Drawing Sheets

U.S. PATENT DOCUMENTS

| | | | |
|---|---|---|---|
| 5,752,681 A * | 5/1998 | Janssen et al. | 248/65 |
| 5,897,082 A * | 4/1999 | Losada | 248/65 |
| 5,931,423 A * | 8/1999 | Heideloff | 248/74.4 |
| 6,079,765 A * | 6/2000 | Zaguskin et al. | 296/146.1 |
| 6,206,330 B1 | 3/2001 | Oi et al. | |
| 6,308,921 B1 | 10/2001 | Borzucki | |
| 6,325,336 B1 * | 12/2001 | Coykendall | 248/68.1 |
| 6,378,813 B1 * | 4/2002 | Gretz | 248/68.1 |
| 6,508,440 B2 * | 1/2003 | Schmidt | 248/62 |
| 6,855,890 B1 * | 2/2005 | Vasichek | 174/135 |
| 6,883,761 B2 | 4/2005 | Boon et al. | |
| 7,007,900 B2 * | 3/2006 | Goodwin et al. | 248/68.1 |
| 7,457,506 B1 * | 11/2008 | Osborne, II | 385/136 |
| 2004/0099772 A1 * | 5/2004 | Durig et al. | 248/68.1 |
| 2005/0263651 A1 * | 12/2005 | Duponchelle | 248/68.1 |
| 2008/0203245 A1 * | 8/2008 | Clark et al. | 248/68.1 |

* cited by examiner

RETAINING ELEMENT INCLUDING ENHANCED ENGAGEMENT FEATURES

CROSS-REFERENCE TO RELATED APPLICATIONS

This application claims the benefit of U.S. Provisional Patent Application Ser. No. 60/871,144 filed on Dec. 21, 2006.

BACKGROUND OF THE INVENTION

The present invention generally relates to a retaining element for securing elongate members, such as conduits, to an installation surface.

Generally, long sections of conduit, pipes and/or wiring are secured to walls or other surfaces by means of conventional straps and fasteners. Such installations can be quite time consuming depending upon the length and number of conduit being secured, as well as the configuration and type of installation surface. Certain installation surfaces, such as concrete, require pre-drilling, which adds further time to complete the overall installation. Also, often installations require a number of conduits to be run side-by-side, thus requiring an array of retaining elements and thus extending the installation time further.

Conventional conduit straps generally comprise a simple arcuate member for engaging the conduit and a planar flange for engaging the installation surface. For convenience and to speed-up installation, installers often use one size strap even though different sizes of conduit are being secured. Thus, the radial curvature of the bottom side of a chosen strap will not likely match the outer diameter of all conduits being installed. Also, installers may only have one-size strap available which does not match the outer diameter of any of the conduit being secured. Such an incompatibility between the conduit and the strap can mean that the conduit is not properly secured to the installation surface. Extra effort to properly secure the installation will generally add to the installation time. Further, on more time consuming installation surfaces installers will often use straps that include two separate arcuate portions connected by an intermediate first portion which receives a single fastener. The arched portions of such two-sided straps traditionally have the same curvature. Thus, while reducing the number of fasteners needed for side-by-side conduit installations, these two-sided straps still encounter the incompatibility problem with conduits of varied diameters.

Additionally, while conventional straps may restrain a portion of conduit from completely separating from its installation surface, they do not always prevent axial sliding of the conduit. Thus, if the conduit is pulled or pushed along its length, it can slide out of its installed position.

Thus, it is desirable to provide a retaining member which overcomes the shortcomings found in the art of straps as set forth above while providing improved structural and operating features and making conduit installation easier.

SUMMARY OF THE INVENTION

One aspect of the present invention relates to a retaining element for securing at least one elongate member to an installation surface in conjunction with a fastener. The retaining element includes a first portion and at least one second portion. The first portion secures the retaining element to the installation surface. The at least one second portion engages the elongate member. Also, the second portion defines a single continuous arch formed by a plurality of engagement surfaces disposed on a bottom side of the second portion. The engagement surfaces define a portion of the perimeter of at least two substantially overlapping shapes having different dimensions. In this way, upon installation the elongate member directly engages and is secured to both the installation surface and at least one of the engagement surfaces.

Additionally, the substantially overlapping shapes can be substantially elliptical or more specifically they can be substantially circular. Also, the substantially overlapping shapes can be substantially similar shapes with different proportions or dimensions.

Further, at least one embossing element can protrude from the bottom side for preventing movement of the elongate member. Also, the at least one embossing element can be centrally disposed on the bottom side. Further, the at least one embossing element can include at least two embossing elements. The engagement surfaces can include at least three contoured surfaces each defining a portion of the perimeter of a distinct shape having a different dimension. The at least one second portion can include at least two second portions that are spaced from one another and disposed on opposed sides of the first portion. Also, the first portion can be integrally formed with the second portion. Further, the first portion can be substantially planar. Further still, a rib can protrude from at least one side of the retaining element. The rib can extend substantially across both the first and second portions.

Also, the engagement surfaces can include a first contoured surface and a second contoured surface. At least part of the second contoured surface can be disposed between the first contoured surface and the first portion. Additionally, the first contoured surface can include a first radius of curvature that is smaller than a second radius of curvature of the second contoured surface. Each radius of curvature is preferably sized to conform to a pre-select size of elongate member. The engagement surfaces can include a third contoured surface. At least part of the third contoured surface can be disposed between the second contoured surface and the first portion. Further, the third contoured surface can include a radius of curvature that is larger than the second contoured surface. The first portion can also include a raised portion on opposed edges for reinforcement. Further still, a planar flange can protrude from the second portion. The planar flange can be disposed on an opposite side of the second portion from the first portion. Any or all of the countered surfaces can be generally elliptical, circular or made to conform to some other pre-defined shape.

These and other objects, features, and advantages of this invention will become apparent from the following detailed description of illustrative embodiments thereof, which is to be read in connection with the accompanying drawings.

DETAILED DESCRIPTION OF THE PREFERRED EMBODIMENTS

This invention pertains to a retaining element with improved engagement surfaces for retaining elongate members, particularly for retaining varying sizes of electrical conduit. The features of the present invention can decrease the time required to complete an installation. Also the present invention can provide improved and/or proper retention of conduit of varied diameters. Additionally, the features of the present invention can be used with the most common sizes of conventional conduit. However, while reference is made herein to the present invention used in conjunction with conduit, it should be understood that it has application to almost any relatively thin elongate members, such as conduit, pipes, cables, wires and the like.

Figure 1:
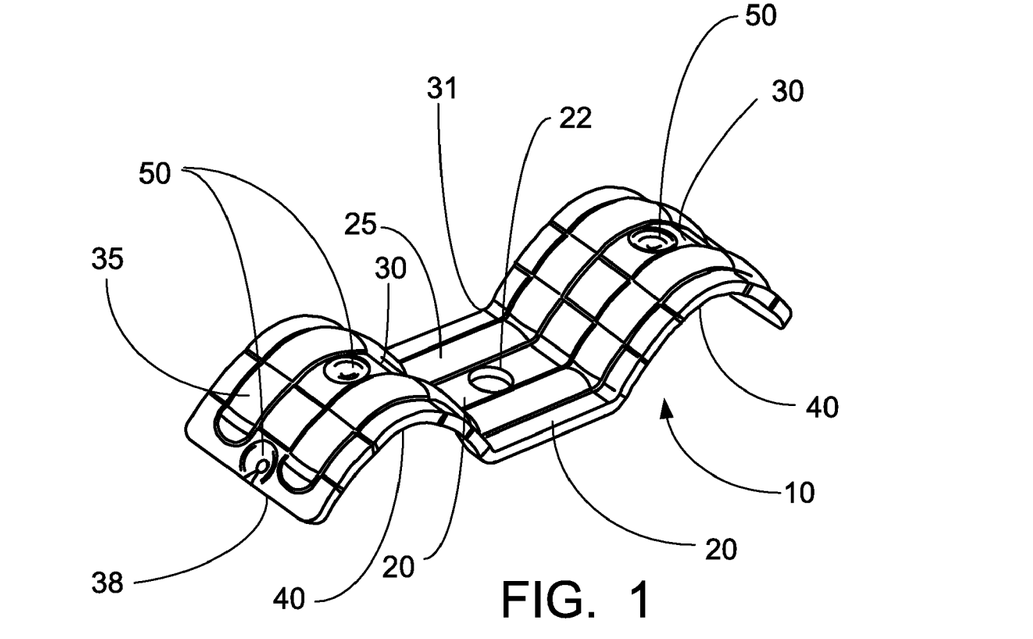
FIG. 1 is a top perspective view of one embodiment of a retaining element in accordance with the present invention.
Figure 2A:
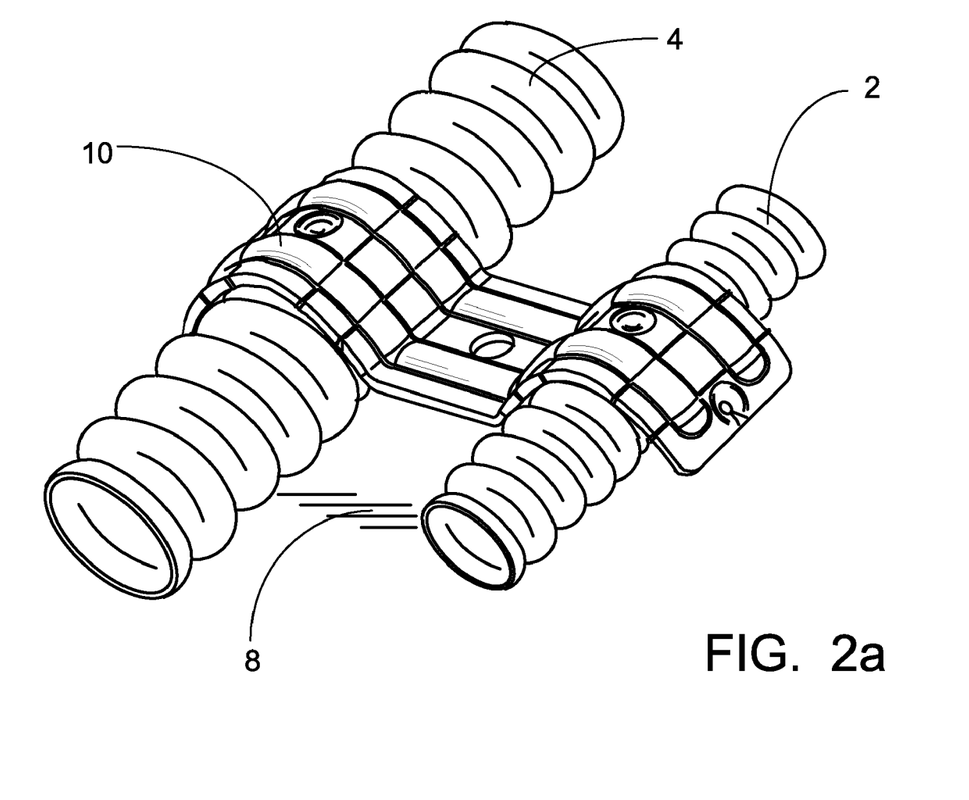
FIG. 2a is a top perspective view of a ½" and a ⅜" electrical conduit positioned between an installation surface and the retaining element of FIG. 1.
Figures 2B, 2C, 2D, 2E:
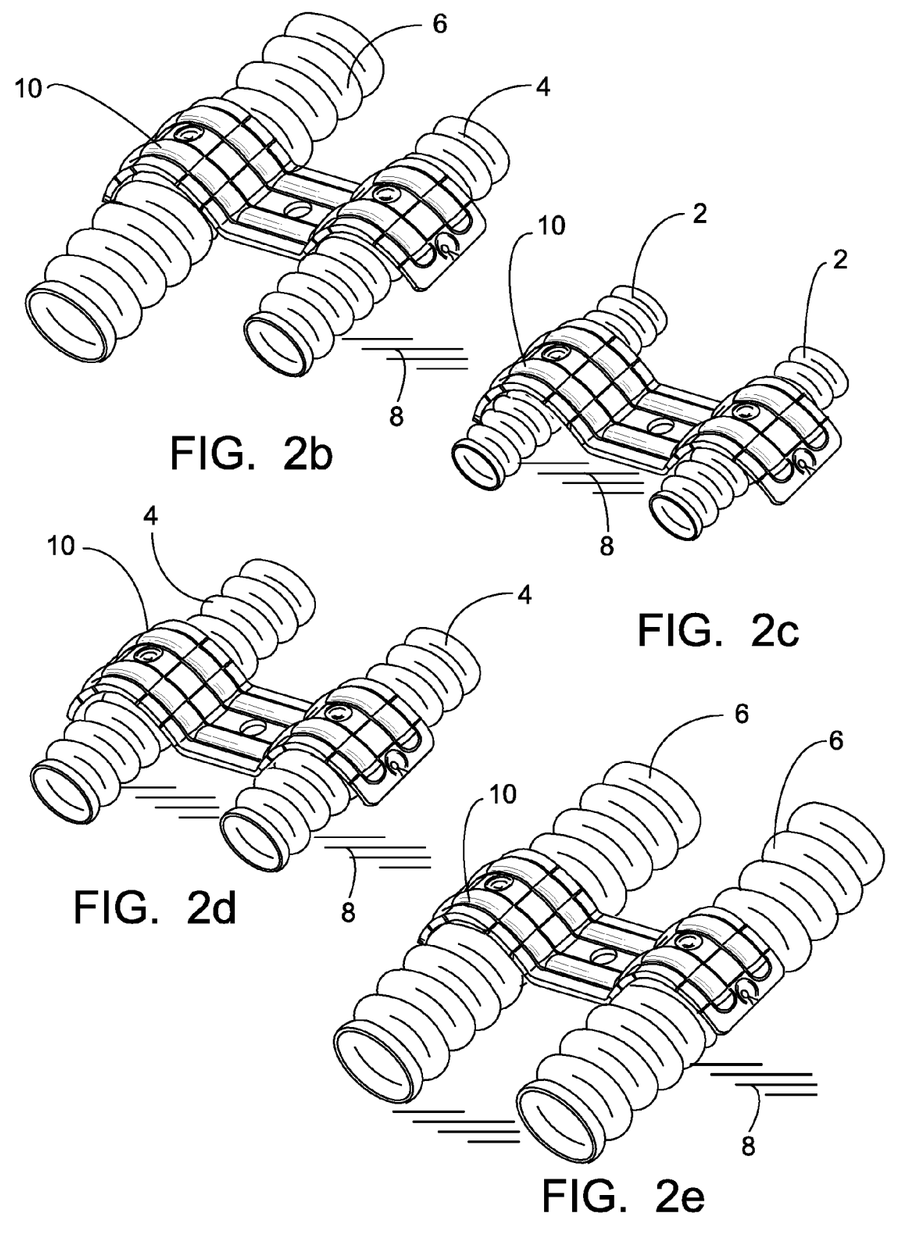
FIG. 2b is a top perspective view of a ¾" and a ½" electrical conduit positioned between an installation surface and the retaining element of FIG. 1.
FIG. 2c is a top perspective view of two ⅜" electrical conduits positioned between an installation surface and the retaining element of FIG. 1.
FIG. 2d is a top perspective view of two ½" electrical conduits positioned between an installation surface and the retaining element of FIG. 1.
FIG. 2e is a top perspective view of two ⅜" electrical conduits positioned between an installation surface and the retaining element of FIG. 1.
Figure 3:
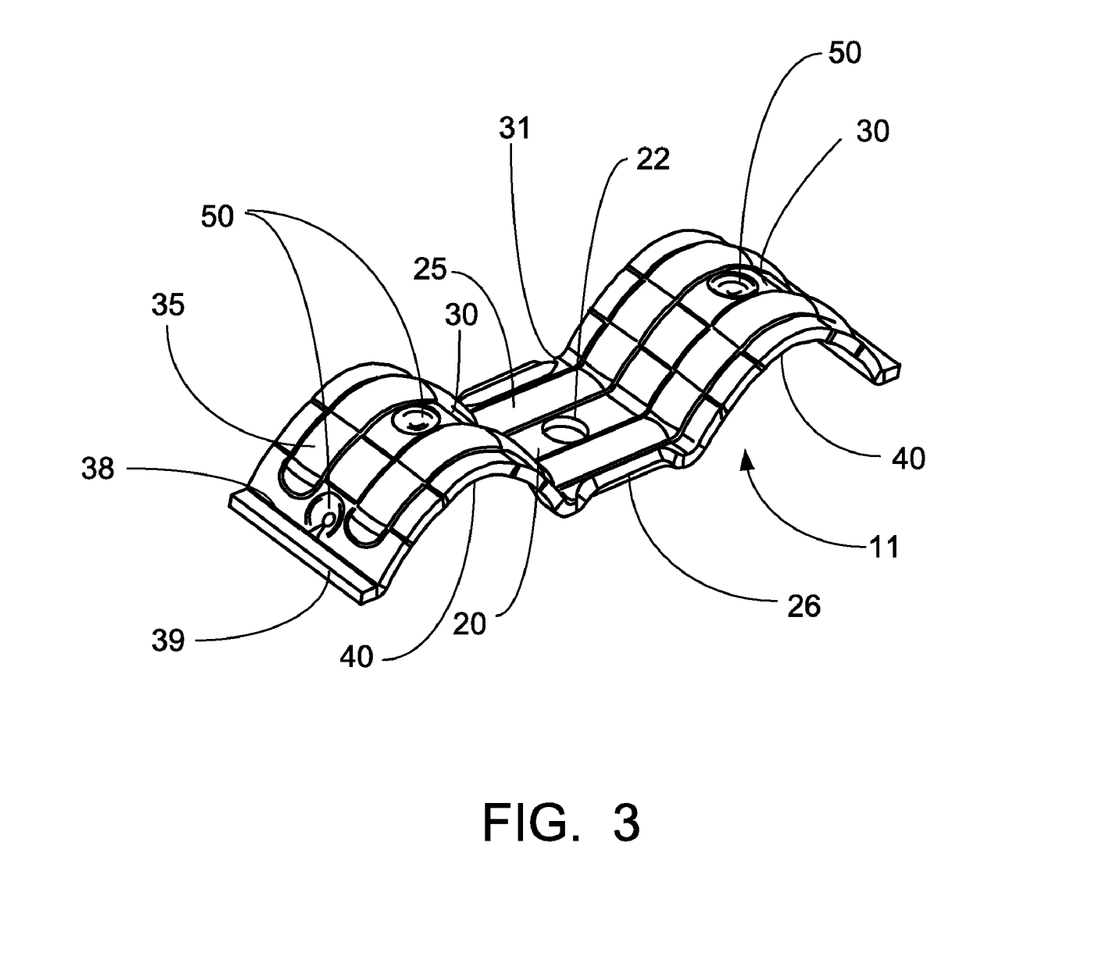
FIG. 3 is a top perspective view of another embodiment of a retaining element in accordance with the present invention.

With reference to FIG. 1, retaining element 10 is shown in accordance with one embodiment of the present invention. Retaining element 10 preferably includes a generally first portion 20 and at least one second portion 30. The first portion 20 preferably provides a generally planar area for securing or affixing the retaining element 10 to a generally planar installation surface. Preferably, the first portion 20 is provided with an aperture 22 for receiving a screw, bolt, nail or other fastener (not shown). Thus, upon installation the first portion 20 can be generally engaged with or at least disposed generally parallel to the installation surface. However, one of reasonable skill in the art would understand numerous other ways to secure the retaining element to an installation surface. For example, alternatively, the aperture 22 need not be provided, thus allowing installers to make their own hole in the first portion 20 during installation. As a further alternative, a bonding agent could be used between the first portion 20 and an installation surface. As yet a further alternative one or more fasteners could be incorporated into the first portion 20 to even further simplify the overall installation.

The embodiment shown in FIGS. 1-4c includes two symmetrically opposed engagement portions 30. The engagement portions 30 include a lower or bottom surface 40 which is designed for improved engagement with elongate members. In particular, the lower surface 40 is preferably designed to accommodate many common sizes of electrical conduit. The engagement portions 30 are preferably integrally formed with the first portion 20 and joined at the transitional base 31. From the base 31, each engagement portion 30 first extends away from and then towards the plane in which the first portion 20 is disposed. Thus, at least the bottom side 40 of each engagement portion 30 generally forms an arch. A remote or distal edge 38 of the engagement portion 30 can be disposed in the plane in which the first portion 20 is disposed. However, alternatively there can be a gap or distance between the remote edge 38 and the plane of the first portion 20. Thus, upon installation such an alternatively disposed edge 38 would lie further from the installation surface than the first portion 20. Also, the engagement portion 30 preferably forms a one hundred and eighty degree (180°) arch. Thus, the remote edge 38 is preferably designed to lie in the plane of the first portion 20. However, the engagement portion 30 can be formed somewhat raised, so that although the arch still extends over 180°, the edge 38 is not disposed in the plane of the first portion 20. Also, as a further alternative, the engagement portion 30 can be formed to extend less than or greater than 180°.

Further, at least one raised rib 25, 35 preferably extends lengthwise across almost the entire retaining member 10. These ribs 25, 35 can add rigidity and resist longitudinal bending of the member 10. The ribs 25, 35 can be formed be displacing the material, thus forming a channel on the underside of the member 10. Alternatively the ribs 25, 35 could be formed by provided added material on the top side of the member 10.

FIGS. 2a-2e show at least one elongate member 2, 4, 6 secured between the engagement portion 30 and an installation surface 8. The elongate members 2, 4, 6 shown represent three common sizes of electrical conduit; namely ⅜", ½" and ¾" respectively. FIGS. 2a-2e particularly show various combinations of conduit 2, 4, 6 pinned under a retaining element 10.

Additionally, each engagement portion 30 of retaining element 10 is preferably provided with at least one embossing feature 50. In fact, a preferred embodiment includes two embosses 50 on each engagement portion 30. These embosses 50, forming a small dimple on the upper surface and a protrusion 51 (shown in FIGS. 4c, 5c and 6) on the bottom surface 40 are useful for preventing an installed elongate member 2, 4, 6 from sliding along its axis. In particular, with regard to contemporary electrical conduit, which includes a helical channel design on its exterior, the embossing 50 are preferably designed to fit into the channel for a more customized engagement therewith.

FIGS. 3 and 4a-4c show another embodiment of the present invention, namely retaining member 11. Retaining member 11 preferably also includes crimped reinforcement portions 26 on both sides of the first portion 20. Portions 26 are preferably provided to aid in preventing the deformation of member 11 when under a load. The reinforcement 26 can be formed by upwardly bending a portion of the edges of the first portion 20. Alternatively, a shallow tab can be cut from both side edges and then the tab bent back, to form a similar reinforcement. Also, as yet a further alternative, the portions 26 can be bent downwardly, thus not allowing the first portion 20 to fully engage the installation surface once installed.

Additionally, member 11 preferably includes a flange 39 extended from remote edge 38. Also, preferably flange 39 lies in the same plane as first portion 20. A further alternative embodiment (not shown) can include a flange 39 that extends further from engagement portion 30 than what is shown. Also, such an extended flange 39 could include additional fastener apertures for securing the conduit 2, 4, 6 from both lateral sides.

Figure 5A:
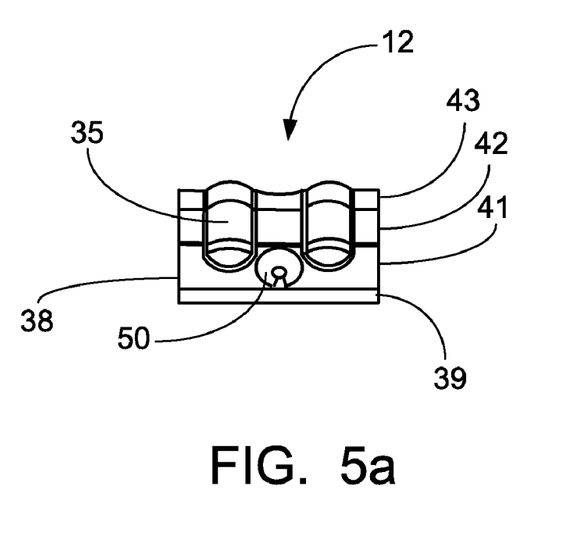
FIGS. 5a-5c are respectively side, top and front views of yet another embodiment of a retaining element in accordance with the present invention.
Figure 5B:
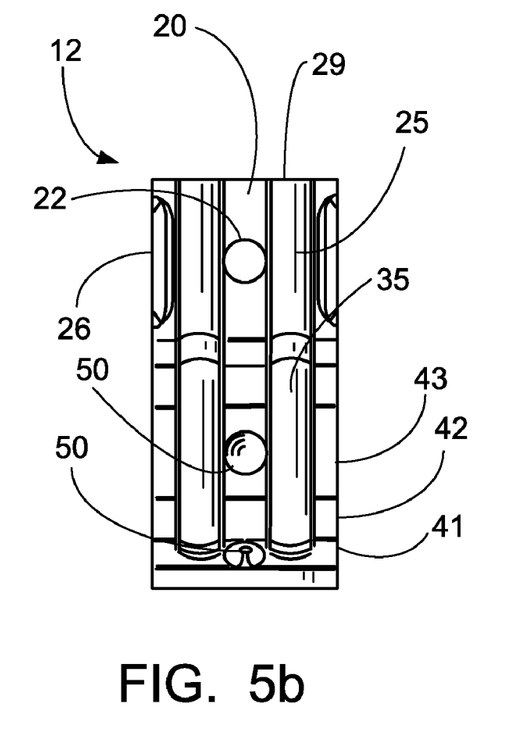
Figure 5C:
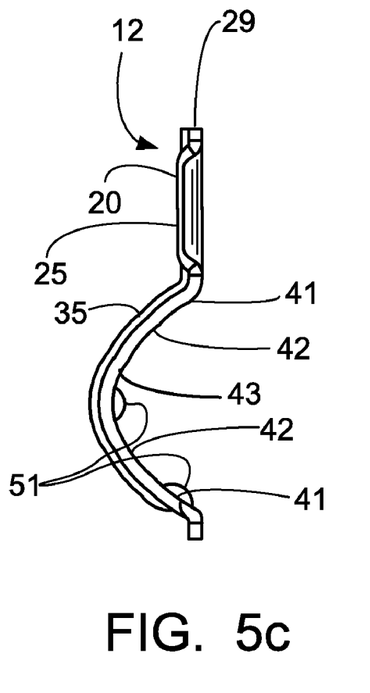
Figure 6:
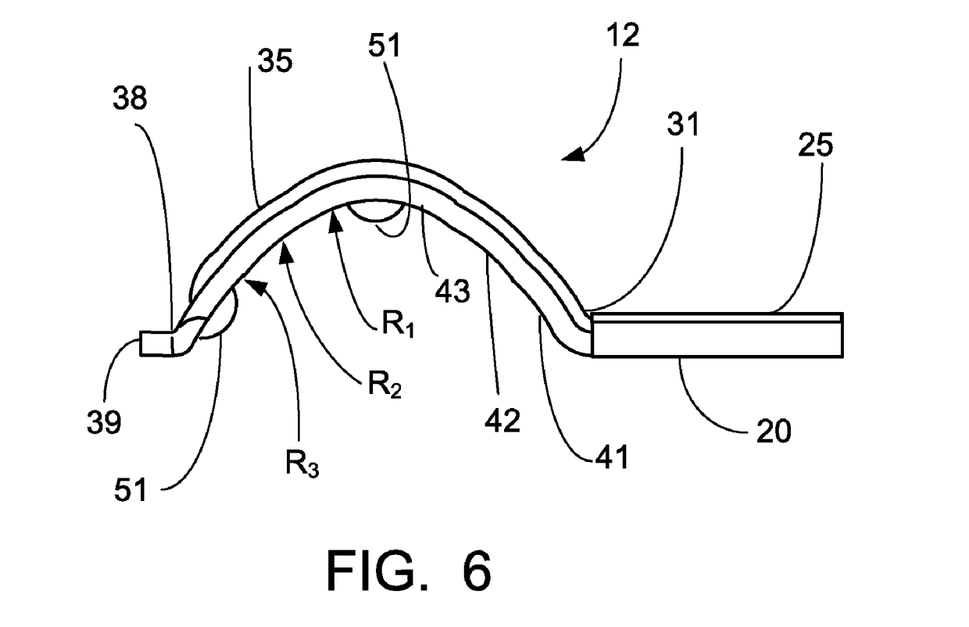
FIG. 6 is an enlarged front view of the retaining element of FIG. 5c.

FIGS. 5a-5c show yet another embodiment of the present invention, namely retaining member 12. This retaining member 12 is similar to the previous embodiments discussed above, however it is provided with only one engagement portion 30, rather than two. This single-sided embodiment can also be used in combination with another similar retaining member 12. In other words, two retaining members 12 can be used in combination, by rotating one of the members 12 one hundred and eighty degrees (180°) and aligning their apertures 22. Thus, they can be coupled with a fastener to form a two-sided member similar to the earlier embodiments.

Figure 4A:
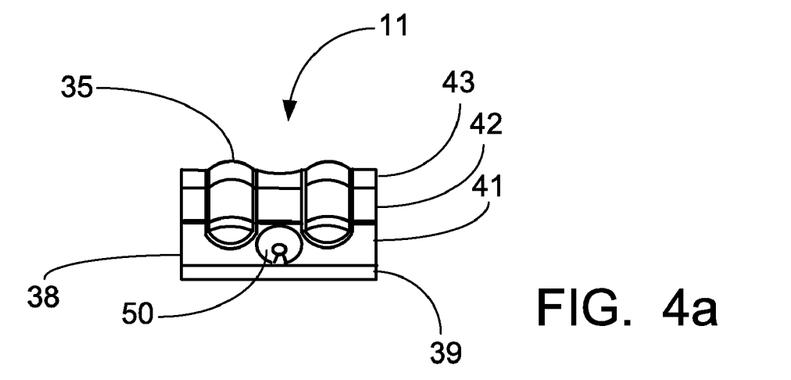
FIGS. 4a-4c are respectively side, top and front views of the retaining element of FIG. 3.
Figure 4B:
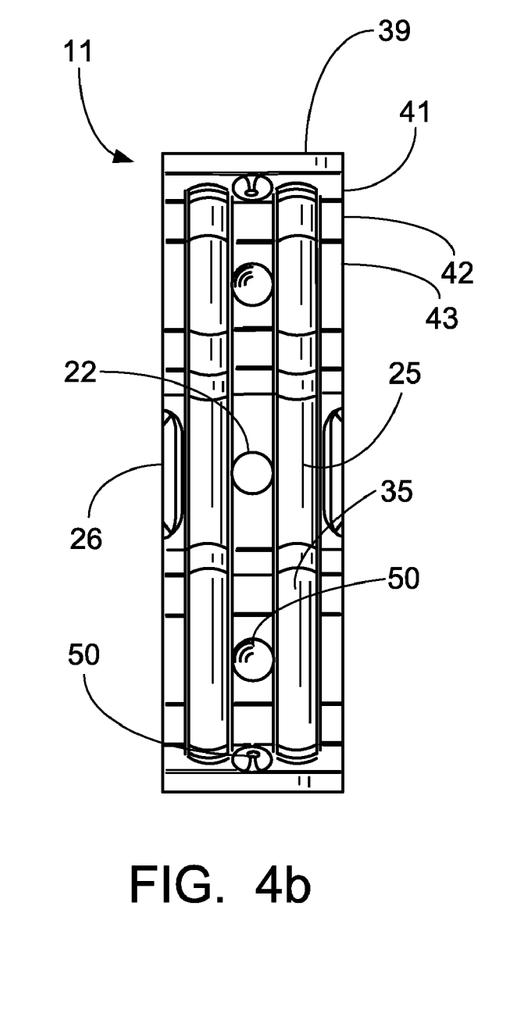
Figure 4C:
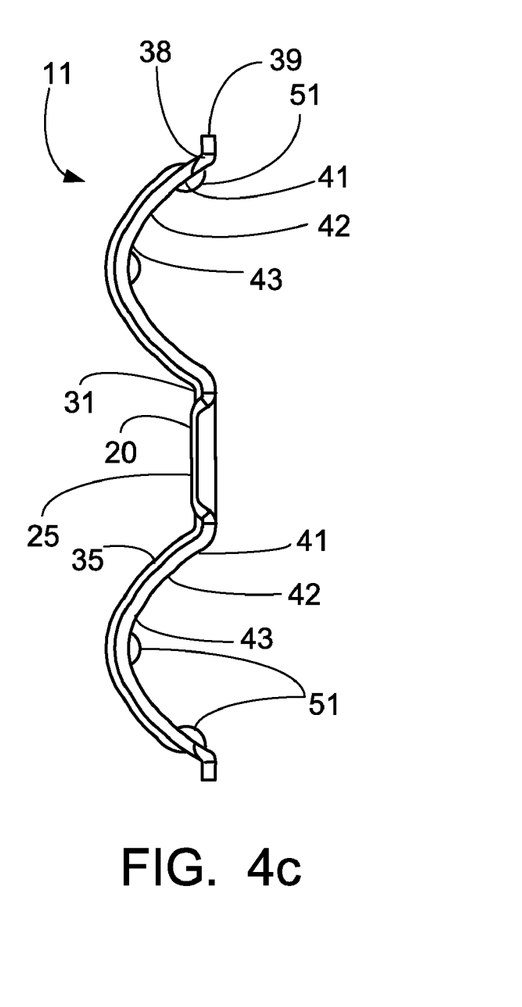

As shown in FIGS. 4c and 5c, the bottom side 40 of the engagement portion 30 preferably includes three different contoured surfaces 41, 42, 43. This plurality of different contoured surfaces 41, 42, 43 is preferably common to all the embodiments of the present invention. However, it should be understood that a greater or fewer number of varied contoured surfaces 41, 42, 43 could be provided. In particular, although three different contoured surfaces are shown in all embodiments, the retaining members 10, 11, 12 can include only two different contoured surfaces. The different contoured surfaces 41, 42, 43 are more clearly shown in FIGS. 6 and 7. Each contoured surface 41, 42, 43 is formed with a different curvature or radius R1, R2, R3, respectively. The radii R1, R2, R3 correspond to the radial outer dimensions of the common electrical conduit discussed above. Thus, the largest radius R3 is preferably located on the outer sections of engagement portion 30 and the smallest radius R1 is preferably at the apex of the bottom side 40. Additionally, the two larger radii R2, R3 are preferably formed on opposed sides of the center contoured surface 41 in order to provide paired surfaces for added stability. Adjoining contoured surfaces converge to form a projection which delimits them. For example, between the apex contoured surface 43 and the intermediate contoured surface 42 a noticeable projection distinguishes one surface from another. However, it should be understood that alternatively only one section need be provided that corresponds with a particular radius. Also, while a pair of opposed matching radial surfaces are shown, such surfaces need not be paired. Such surfaces can be provided as a single unmatched surface or more than two matching surfaces can be provided. Also, radii R1, R2, R3 could be formed larger or smaller than that shown to suit almost any known conduit.

Figure 7:
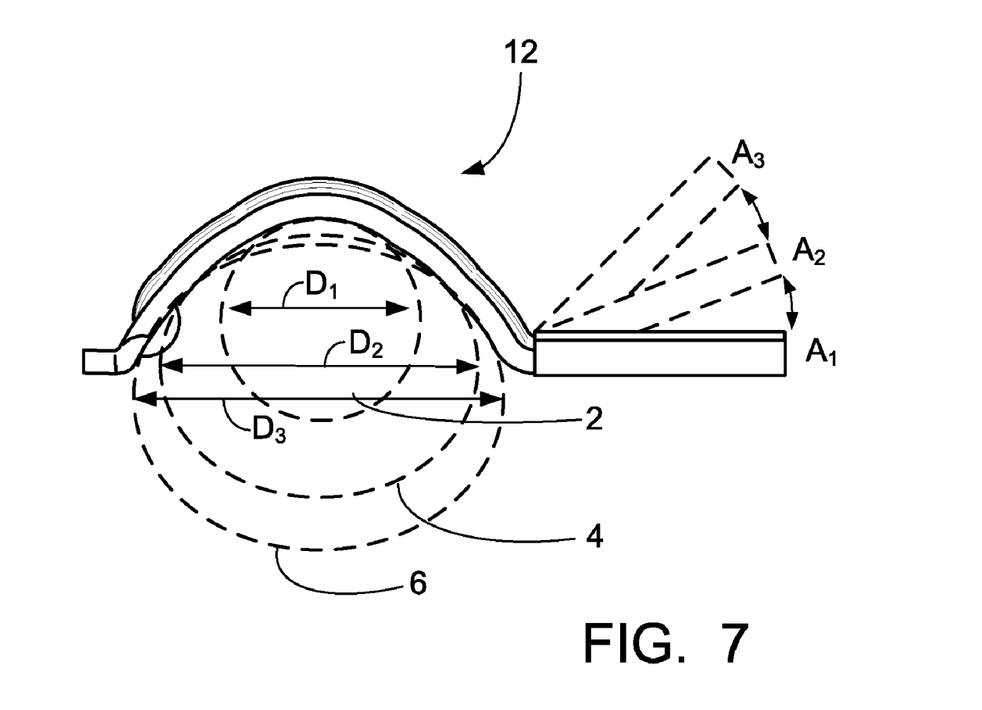
FIG. 7 is an enlarged front view of the retaining element of FIG. 5c, with altered configurations shown in phantom corresponding to elongate members of varied width.

FIG. 7 shows three phantom versions of conduit 2, 4, 6 engaged with the various contoured surfaces 41, 42, 43. The phantom versions of conduit 2, 4, 6 correspond to substantially overlapping ellipses having different circumferences. In a preferred embodiment, the ellipses conforming to the respective conduit 2, 4, 6 are generally circular. It being understood that a circle is one form of ellipse. Preferably, one half the diameter $D_1$, $D_2$, $D_3$ of each of the conduit correspond to the radii $R_1$, $R_2$, $R_3$ discussed above. In this way, the bottom side 40 of the retaining member 10, 11, 12 conforms to at least a portion of the outer surface of the conduit 2, 4, 6, thus providing a more secure engagement. Additionally, FIG. 7 shows that the angle between the first portion 20 and the engagement portion 30 can be changed, as the end of first portion 20 is moved from positions $A_1$, $A_2$ and $A_3$ or any position in between. It should be understood that first portion 20 could be formed into any one of these alternate positions $A_1$, $A_2$ and $A_3$ either during manufacture on during installation.

It should be further understood that while the engagement surfaces 30 shown in the Figures have a generally elliptical curvature, they could be formed with other shapes or contours. Preferably, the engagement surfaces 30 are made so as to conform to the shape or contour of the outer perimeter of a conduit or other member being secured by the retaining element. Thus, the contoured surfaces 41, 42, 43 can be formed to engage other shapes, such as polygonal, non-geometric or custom shapes. Also, each of the contoured surfaces 41, 42, 43 can be formed to engage a different type of shape.

The retaining members 10, 11, 12 of the present invention provide many benefits over the prior art. They are relatively inexpensive, manufactured easily and quickly installed. Additionally, the features of the present invention can be used with most contemporary conduit.

It should be understood that while retaining elements 10, 11, 12 are shown as a single unitary member; they could alternatively be composed of separate parts that are fixedly secured to one another. Also, although the elements 10, 11, 12 are shown to having a constant thickness this too could be altered. For example, the first portion 20 could be thinner or thicker than the engagement portions. Also, certain engagement portions could be thinner or thicker than others. A preferred construction material is contemporary sheet metal or plated steel, although plastic or aluminum will also suffice. Additionally, elements 10, 11 and 12 can be stamped or cast.

Although illustrative embodiments of the present invention have been described herein with reference to the accompanying drawings, it is to be understood that the invention is not limited to those precise embodiments, and that various other changes and modifications may be applied therein by one skilled in the art without departing from the scope or spirit of the invention.

What is claimed is:

1. A retaining element for securing at least one elongate member to an installation surface in conjunction with a fastener, the retaining element comprising:
   a first portion for securing the retaining element to the installation surface; and
   at least one second portion for engaging the elongate member, the second portion defining a single continuous arch formed by a first contoured surface and a second contoured surface, each of the first and second contoured surfaces disposed on a bottom side of the second portion, the first contoured surface defined by a first curvature having a first radius, the second contoured surface defined by a second curvature having a second radius, wherein the first contoured surface and the second contoured surface converge to form a projection delimiting the first and second contoured surfaces, the first radius being different from the second radius, the single continuous arch including a third contoured surface, the third contoured surface disposed on an opposed side of the first contoured surface relative to the second contoured surface, the third contoured surface defined by a third curvature having a third radius, wherein the second radius and third radius are equal, whereby upon installation the elongate member directly engages the installation surface and an opposed substantial extent of at least one of the first, second and third contoured surfaces.

2. The retaining element as set forth in claim 1, wherein the first and second contoured surfaces define a portion of the perimeter of at least two substantially overlapping shapes having different dimensions, wherein the substantially overlapping shapes are substantially elliptical.

3. The retaining element as set forth in claim 2, wherein at least one of the substantially overlapping shapes is substantially circular.

4. The retaining element as set forth in claim 1, wherein the first and second contoured surfaces define a portion of the perimeter of at least two substantially overlapping shapes having different dimensions, wherein the substantially overlapping shapes are substantially similar shapes.

5. The retaining element as set forth in claim 1, further comprising:
   at least one embossing element protruding from the bottom side for preventing movement of the elongate member.

6. The retaining element as set forth in claim 5, wherein the at least one embossing element is centrally disposed on the bottom side.

7. The retaining element as set forth in claim 5, wherein the at least one embossing element includes at least two embossing elements.

8. The retaining element as set forth in claim 1, wherein the at least one second portion includes at least two second portions that are spaced from one another and disposed on opposed sides of the first portion.

9. The retaining element as set forth in claim 1, wherein the first portion is integrally formed with the second portion.

10. The retaining element as set forth in claim 1, further comprising a rib protruding from at least one side of the retaining element.

11. The retaining element as set forth in claim 10, wherein the rib extends substantially across both the first and second portions.

12. The retaining element as set forth in claim 1, wherein the first portion is substantially planar.

13. The retaining element as set forth in claim 1, wherein the single continuous arch includes a fourth contoured surface, the second contoured surface being disposed between the first contoured surface and the fourth contoured surface.

14. The retaining element as set forth in claim 13, wherein the fourth contoured surface is defined by a fourth curvature having a fourth radius, the fourth radius being different from the first radius of curvature.

15. The retaining element as set forth in claim 14, wherein the first portion includes opposed edges each extending away from the second portion, each of the edges including a raised portion for reinforcement of the first portion.

16. The retaining element as set forth in claim 1, further comprising:
a planar flange protruding from the second portion, the planar flange disposed on an opposite side of the second portion from the first portion.

17. The retaining element as set forth in claim 1, wherein the first radius is smaller than the second radius.

18. The retaining element as set forth in claim 13, wherein the fourth contoured surface is defined by a fourth curvature having a fourth radius, the fourth radius being different from the second radius of curvature.

19. The retaining element as set forth in claim 1, wherein at least one of the first, second and third radii have a constant radius.

20. The retaining element as set forth in claim 1, wherein the first curvature and the second curvature each form a cavity, a non-mutual portion of the cavities being separated by the projection.

21. The retaining element as set forth in claim 1, wherein the second contoured surface and the third contoured surface converge to form a projection delimiting the second and third contoured surfaces.

22. The retaining element as set forth in claim 1, wherein upon installation the elongate member directly engages both the first and third contoured surfaces.

* * * * *

UNITED STATES PATENT AND TRADEMARK OFFICE
CERTIFICATE OF CORRECTION

| | | |
|---|---|---|
| PATENT NO. | : 7,770,851 B2 | Page 1 of 1 |
| APPLICATION NO. | : 11/956398 | |
| DATED | : August 10, 2010 | |
| INVENTOR(S) | : Alain Michaud | |

It is certified that error appears in the above-identified patent and that said Letters Patent is hereby corrected as shown below:

ON THE COVER PAGE:

Now reads: "(74) Attorney, Agent, or Firm-Hoffman & Baron, LLP"

Should read: -- (74) Attorney, Agent, or Firm-Hoffmann & Baron, LLP --

Signed and Sealed this
Eighteenth Day of January, 2011

David J. Kappos
*Director of the United States Patent and Trademark Office*